United States Patent
Park et al.

(10) Patent No.: US 11,764,346 B2
(45) Date of Patent: Sep. 19, 2023

(54) METHOD AND SYSTEM FOR SILICON-DOMINANT LITHIUM-ION CELLS WITH CONTROLLED UTILIZATION OF SILICON

(71) Applicant: Enevate Corporation, Irvine, CA (US)

(72) Inventors: Benjamin Park, Mission Viejo, CA (US); Ian Browne, Orange, CA (US); Sung Won Choi, San Diego, CA (US); Fred Bonhomme, Lake Forest, CA (US)

(73) Assignee: ENEVATE CORPORATION, Irvine, CA (US)

( * ) Notice: Subject to any disclaimer, the term of this patent is extended or adjusted under 35 U.S.C. 154(b) by 202 days.

(21) Appl. No.: 16/594,508

(22) Filed: Oct. 7, 2019

(65) Prior Publication Data
US 2021/0104724 A1    Apr. 8, 2021

(51) Int. Cl.
*H01M 4/04*    (2006.01)
*H01M 10/44*    (2006.01)
(Continued)

(52) U.S. Cl.
CPC ......... *H01M 4/0447* (2013.01); *H01M 4/364* (2013.01); *H01M 4/386* (2013.01);
(Continued)

(58) Field of Classification Search
None
See application file for complete search history.

(56) References Cited

U.S. PATENT DOCUMENTS

2019/0229378 A1*    7/2019    Zhang ................. G01R 31/382

FOREIGN PATENT DOCUMENTS

| JP | 11339796 | 12/1999 |
|---|---|---|
| JP | H11339796 A * | 12/1999 |

(Continued)

OTHER PUBLICATIONS

Yao et al., Next Generation Anodes, FY 2018 3rd Quarter Progress Report, pp. 21-23: "Operando quantification of lithiation-delithiation behavior of silicon-graphite composite electrodes for lithium-ion batteries" https://www.nrel.gov/transportation/assets/pdfs/next-gen-anodes-q3-progress-report-fy1 (Year: 2018).*

(Continued)

*Primary Examiner* — Zhongqing Wei
(74) *Attorney, Agent, or Firm* — McAndrews, Held & Malloy, Ltd.

(57) ABSTRACT

Systems and methods for silicon-dominant lithium-ion cells with controlled utilization of silicon may include a cathode, an electrolyte, and an anode, where the anode has an active material comprising more than 50% silicon. The battery may be charged by lithiating silicon while not lithiating carbon. The active material may comprise more than 70% silicon. A voltage of the anode during discharge of the battery may remain above a minimum voltage at which silicon can be lithiated. The anode may have a specific capacity of greater than 3000 mAh/g. The battery may have a specific capacity of greater than 1000 mAh/g. The anode may have a greater than 90% initial Coulombic efficiency and may be polymer binder free. The battery may be charged at a 10C rate or higher. The battery may be charged at temperatures below freezing without lithium plating. The electrolyte may comprise a liquid, solid, or gel.

24 Claims, 14 Drawing Sheets

(51) Int. Cl.
    *H01M 4/38*     (2006.01)
    *H01M 4/587*     (2010.01)
    *H01M 4/36*     (2006.01)
    *H01M 10/0525*     (2010.01)
    *H01M 4/02*     (2006.01)

(52) U.S. Cl.
    CPC ....... *H01M 4/587* (2013.01); *H01M 10/0525* (2013.01); *H01M 10/446* (2013.01); *H01M 2004/027* (2013.01)

(56) References Cited

FOREIGN PATENT DOCUMENTS

| WO | 2019161288 | | 8/2019 |
|---|---|---|---|
| WO | WO2019161288 A | * | 8/2019 |

OTHER PUBLICATIONS

Yao, et al., "Opernado Quantification of Lithiation-Delithiation Behavior of Silicon-Graphite Composite Electrodes for Lithium-Ion Batteries? in Dees, Dennis, Update FY2018 Q3 Progress Report" Next Generation Anodes for Lithium-ion Batteries. (2018), p. 21-23 [online]<https://www.nrel.gov/transportation/assets/pdfs/next-gen-anodes-q3-progress-report-fy18.pdf>.

Notification of Transmittal of the International Search Report and the Written Opinion of the International Searching Authority, or the Declaration, International Application No. PCT/US20/53203, International Filing Date Sep. 29, 2020, dated Dec. 31, 2020.

* cited by examiner

METHOD AND SYSTEM FOR SILICON-DOMINANT LITHIUM-ION CELLS WITH CONTROLLED UTILIZATION OF SILICON

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for silicon-dominant lithium-ion cells with controlled utilization of silicon.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for silicon-dominant lithium-ion cells with controlled utilization of silicon, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
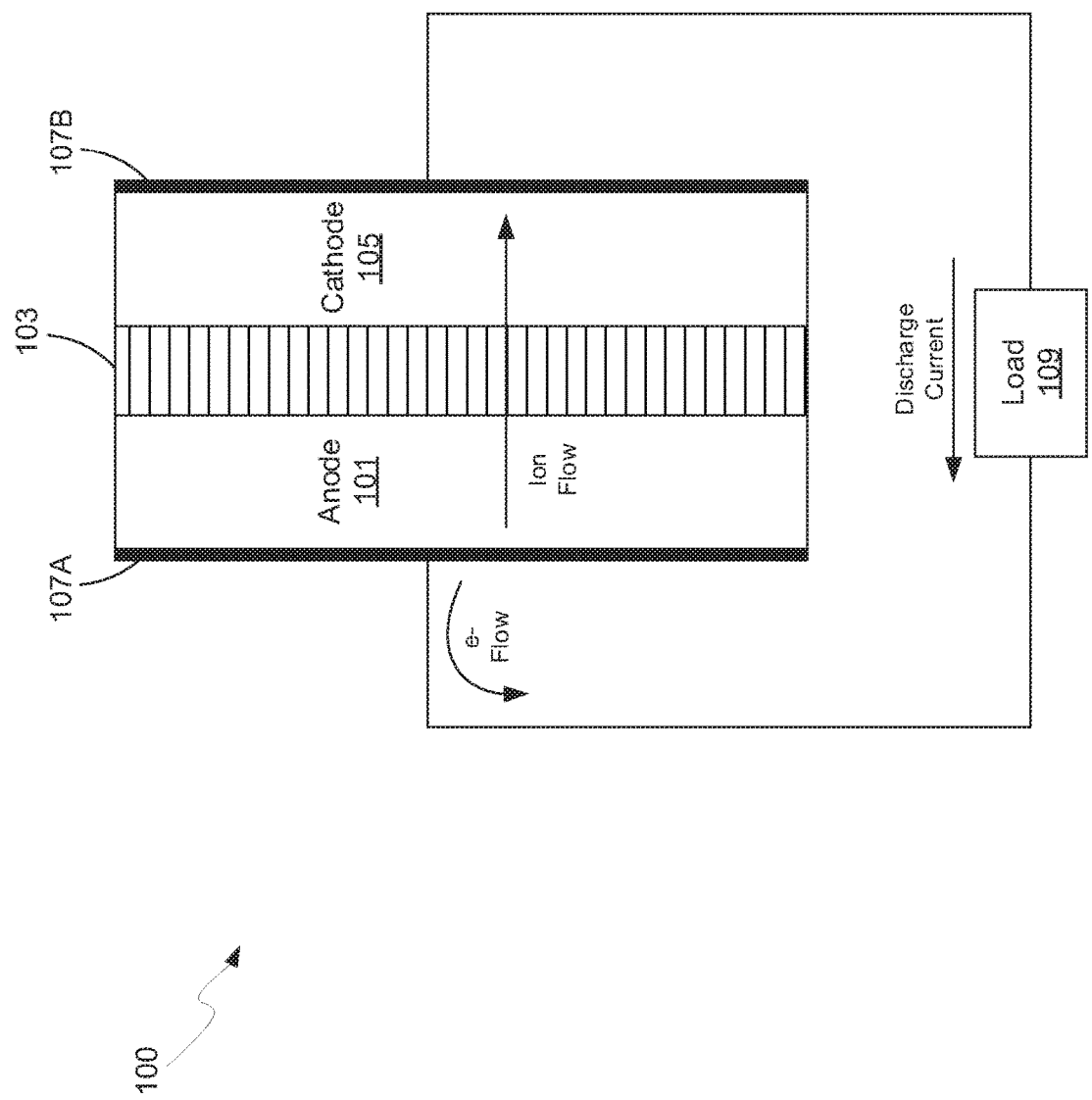
FIG. 1 is a diagram of a lithium ion battery, in accordance with an example embodiment of the disclosure.

FIG. 1 is a diagram of a lithium ion battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that include a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example. In another example, the anodes may comprise more than 70% silicon and may comprise self-standing, monolithic, single-particle films without any binder material.

The anode 101 and cathode 105 store the ion used for separation of charge, such as lithium, for example. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

Current state-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation, illustrated in FIG. 3.

While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Figure 2:
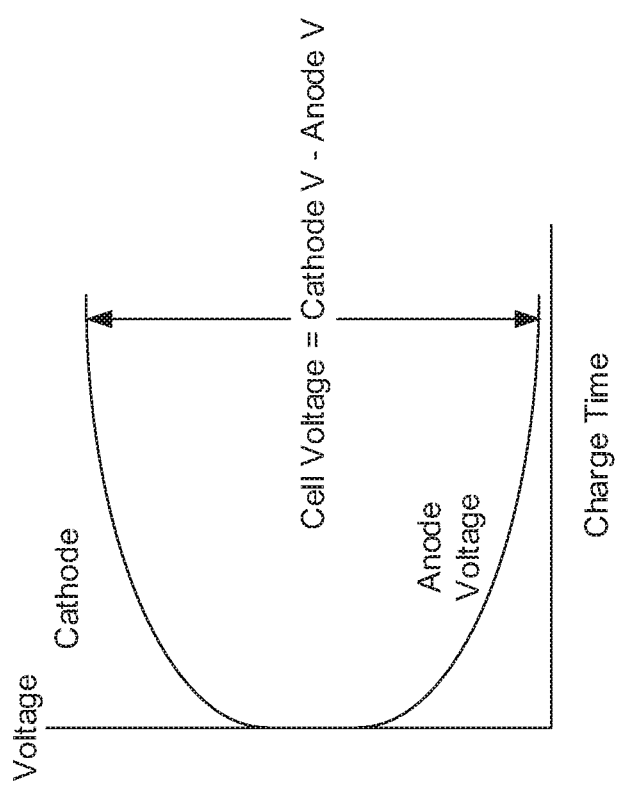
FIG. 2 illustrates anode, cathode, and cell voltages during charging of a lithium ion cell, in accordance with an example embodiment of the disclosure.

FIG. 2 illustrates anode, cathode, and cell voltages during charging of a lithium ion cell, in accordance with an example embodiment of the disclosure. Referring to FIG. 2, there is shown the voltages versus time in a lithium ion cell during charging. As the cell is charged, the cathode voltage increases as it provides lithium to the anode and the anode voltage decreases as it lithiates, resulting in an increasing cell voltage.

Figure 3:
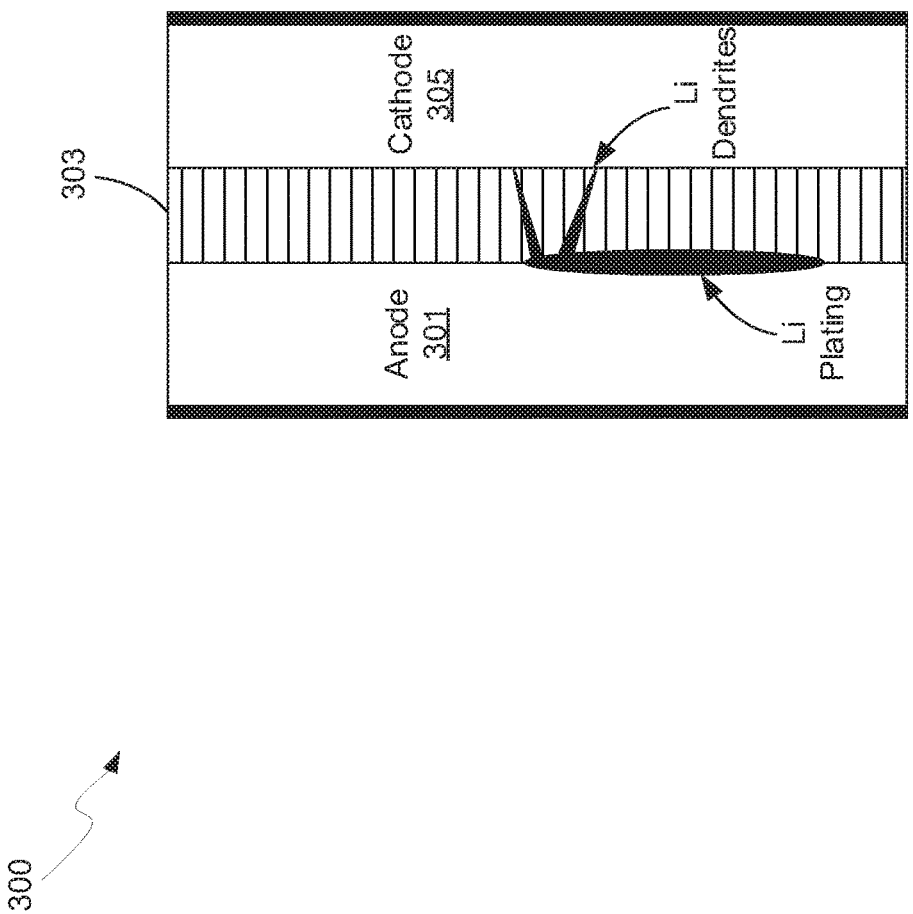
FIG. 3 illustrates a lithium ion cell with lithium plating and dendrites, in accordance with an example embodiment of the disclosure.

In conventional graphite anodes, any time the anode voltage decreases to a level at which graphite is being lithiated, lithium plating may also occur, reducing the capacity of the cell and causing safety issues with dendrites forming over time, catastrophically shorting the cell, as shown in FIG. 3.

FIG. 3 illustrates a lithium ion cell with lithium plating and dendrites, in accordance with an example embodiment of the disclosure. Referring to FIG. 3, there is shown battery 300 with anode 301, separator 303, and cathode 305. In this example, the anode comprises a graphite active material, where over time, low anode voltages cause lithium plating and also the formation of dendrites. Dendrites extending through the separator 303 cause catastrophic failure of a lithium ion cell and can result in fire. This effect can be eliminated with a silicon-dominant anode where there is little or no graphite in the active material and by configuring the discharge voltage to only decrease to a level where the silicon is being lithiated, thereby never reaching a low enough voltage where any graphite in the cell lithiates.

Figure 4:
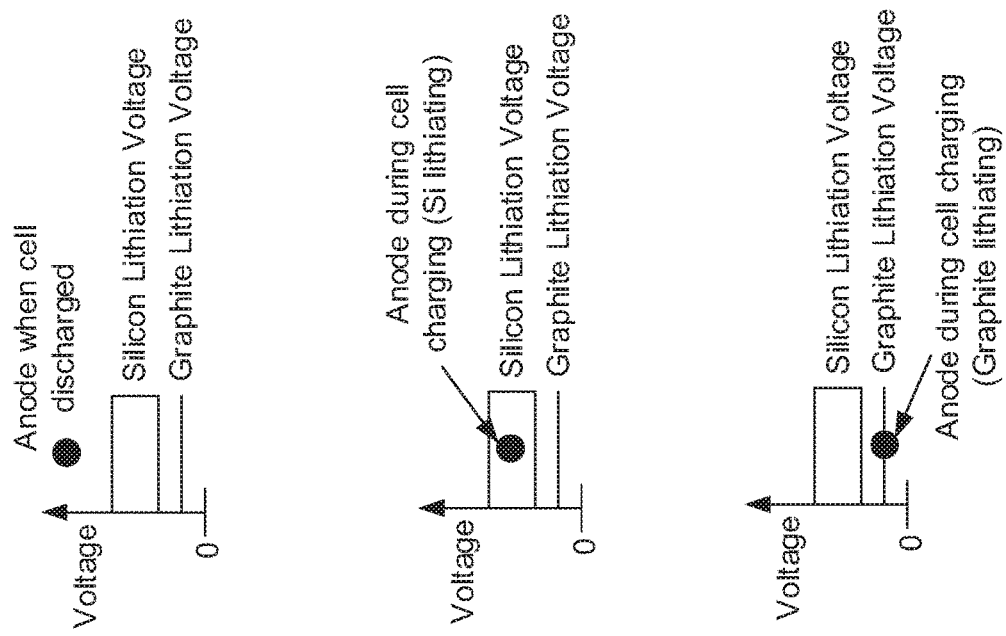
FIG. 4 illustrates voltage levels during charging of a silicon additive graphite anode, in accordance with an example embodiment of the disclosure.

FIG. 4 illustrates voltage levels during charging of a silicon additive graphite anode, in accordance with an example embodiment of the disclosure. Referring to FIG. 4, there is shown three different voltage stages of a silicon and graphite anode. The upper stage illustrates the anode voltage when the cell is fully discharged and the anode voltage is at its highest level, above the voltages at which either silicon or graphite lithiate. At this stage, the anode is delithiated.

The second stage illustrates an intermediate voltage where the cell is charging and the silicon is being lithiated while the graphite is not yet reacting. For silicon-additive graphite anodes, the graphite needs to be lithiated to obtain full cell capacity, so the cell is further charged to the third stage. In the third stage, the cell is continuing to charge and the anode voltage is now low enough that the silicon is fully lithiated and the graphite is being lithiated. And since the voltage continues to decrease as the graphite is lithiated, the voltage decreases to levels at which plating can occur and dendrites can form, as discussed above.

Figure 5A:
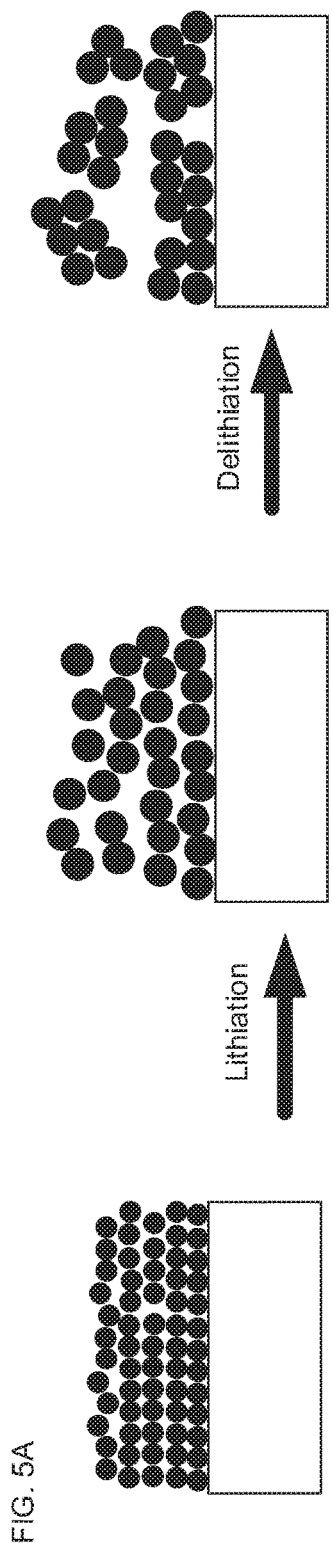
FIGS. 5A and 5B illustrate mechanical processes during lithiation and delithiation of a silicon-additive anode and of a silicon film anode, in accordance with an example embodiment of the disclosure.
Figure 5B:
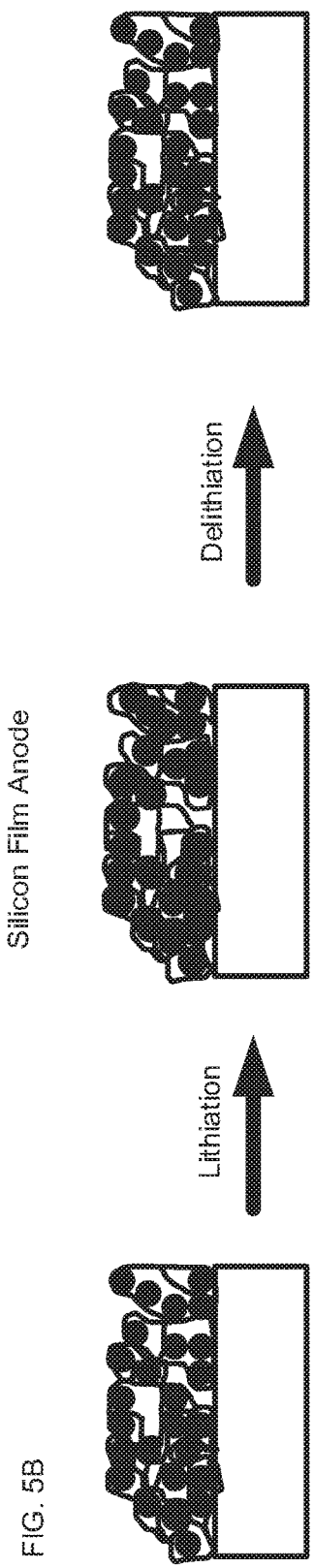

FIGS. 5A and 5B illustrate mechanical processes during lithiation and delithiation of a silicon-additive anode and of a silicon film anode, in accordance with an example embodiment of the disclosure. Referring to FIG. 5A, there is shown a representation of the expansion and contraction of the active material of the anode, where the material comprises graphite with added silicon. The first pane being before lithiation, the second being after lithiation, and the third being after delithiation.

In such conventional silicon containing anodes, the graphite and silicon material is typically held together by a soft polymer binder, allowing the material to expand during lithiation, expansion being a normal process with silicon during lithiation. The silicon is highly or fully lithiated so that the graphite of the anode active material can be sufficiently lithiated so as to enable full cell capacity, as illustrated in FIG. 4. The expansion of fully lithiated silicon is ~300-400% in silicon additive graphite anodes, which leads to significant deformation or failure of the binder. In addition, when the active material delithiates, the silicon contracts resulting in tensile stress, the polymer that holds the electrode together fails and cracks may form in the material.

The silicon film anode shown in FIG. 5B is held together by a strong conductive matrix, and does not utilize graphite as an active material, so a lower fraction of the larger amount of silicon, as compared to the silicon graphite anode, can be used during lithiation, resulting in less swelling or expansion of the electrode. In addition, a nano-coating on the electrode material prevents side reactions. Therefore, with the reduced expansion and strong conductive matrix, silicon-dominant anodes do not have cracking the issues that silicon graphite anodes have.

Figure 6:
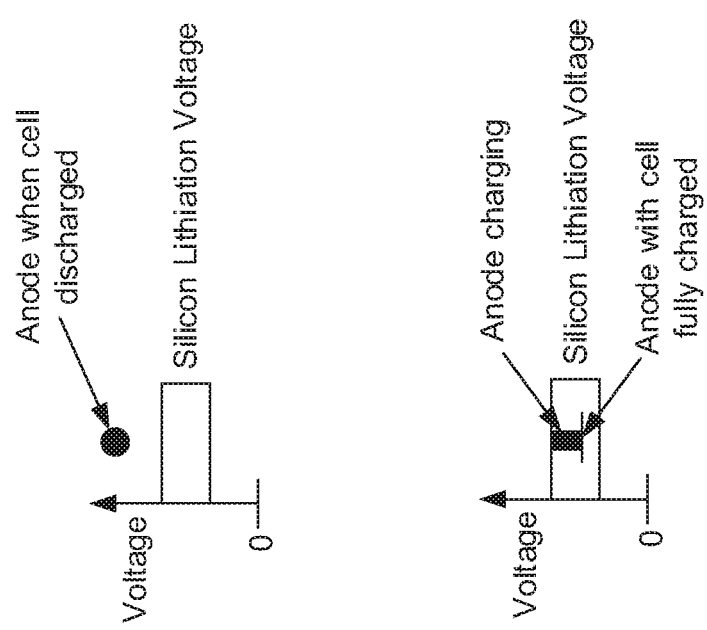
FIG. 6 illustrates voltage levels during charging of a silicon film anode, in accordance with an example embodiment of the disclosure.

FIG. 6 illustrates voltage levels during charging of a silicon film anode, in accordance with an example embodiment of the disclosure. Referring to FIG. 6, there is shown two different voltage stages of a silicon-dominant anode. As there is little or no graphite in the active material of the anode, the lithiation voltage of carbon is not shown here as there is no lithiation of graphite. The upper stage illustrates the anode voltage when the cell is fully discharged and the anode voltage is at its highest level, above the voltage at which silicon lithiates. At this stage, the anode is delithiated. As the anode is charged, its voltage decreases as the silicon lithiates, and since the anode only uses silicon for lithiation, and not all of the silicon is lithiated for a full charge, the cell is fully charged when the voltage falls somewhere within the silicon lithiation voltage range, i.e., the voltage does not drop below the lower voltage edge of the silicon lithiation range. As the anode voltage is never as low or below the lower silicon lithiation voltage, lithium plating is essentially eliminated little if any carbon is lithiated. For example, less than 10% of the carbon may be lithiated in normal operation. In another example, less than 20% of the carbon is lithiated in normal operation. In addition, since a smaller fraction of the silicon is lithiated, there is reduced swelling, as discussed above.

Figure 7:
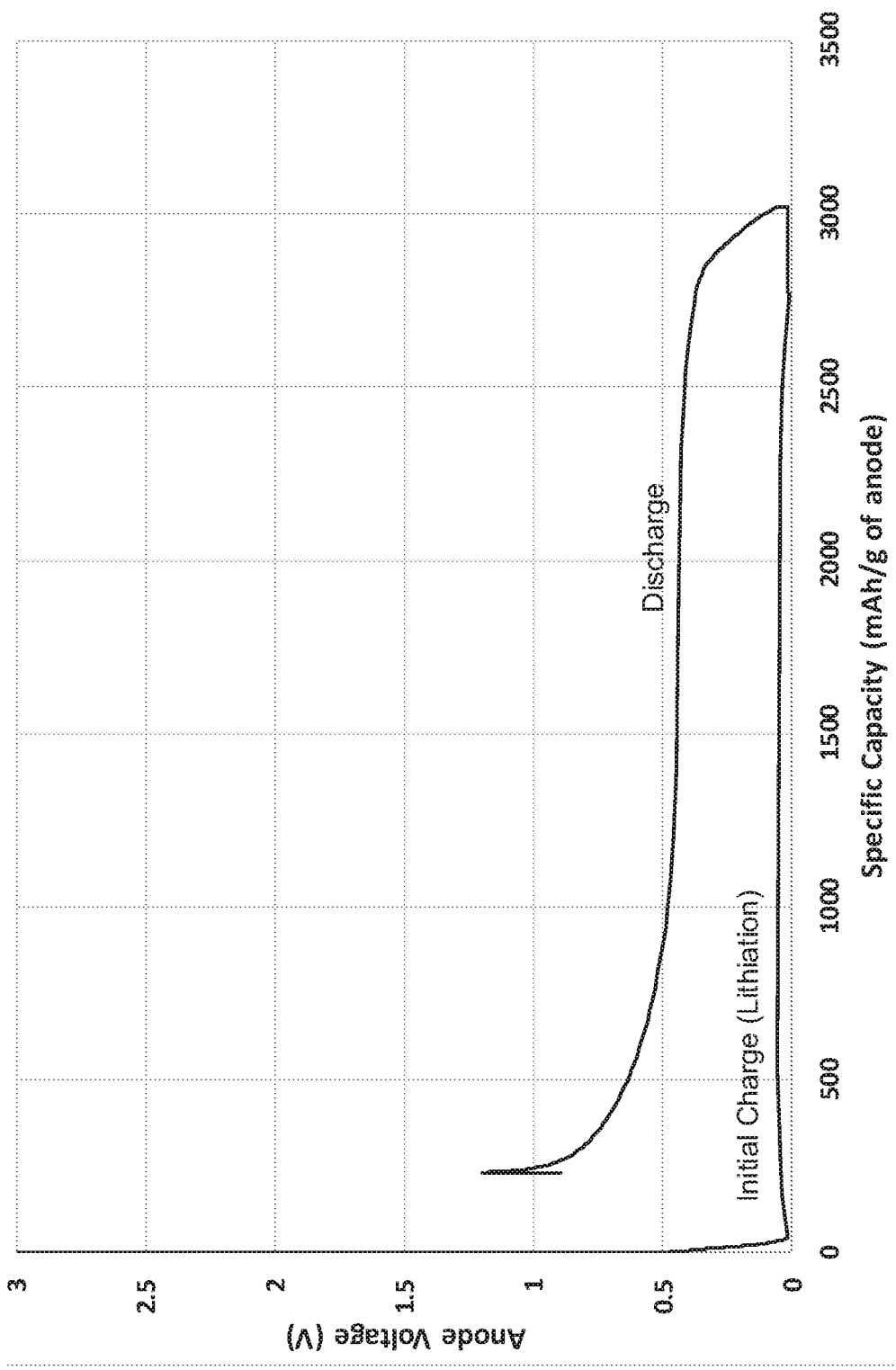
FIG. 7 illustrates the anode half-cell first cycle voltage profile of a silicon-dominant anode, in accordance with an example embodiment of the disclosure.

FIG. 7 illustrates the anode half-cell first cycle voltage profile of an example silicon-dominant anode. In this case, the initial lithiation voltage curve is lower than that seen during normal operation due to it being the initial charge. Referring to FIG. 7, there is shown the voltage profile for a silicon-dominant anode, showing the first charge capacity of the anode to be ~3000 mAh/g and the irreversible capacity of the anode to be ~250 mAh/g, resulting in an initial Coulombic efficiency of 92%. In this initial charge process, the anode was charged at a C/16 rate and the anode voltage ranged from 0.01 V to 1.2V.

In an example embodiment, a silicon film anode with >70% silicon achieves 3000 mAh/g specific capacity (compared to 372 mAh/g max for graphite) and 1000-2000 mAh/g when utilized in a cell, resulting in volumetric energy density up to ~2000 Wh/L and gravimetric energy density up to ~350 Wh/kg.

Figure 8:
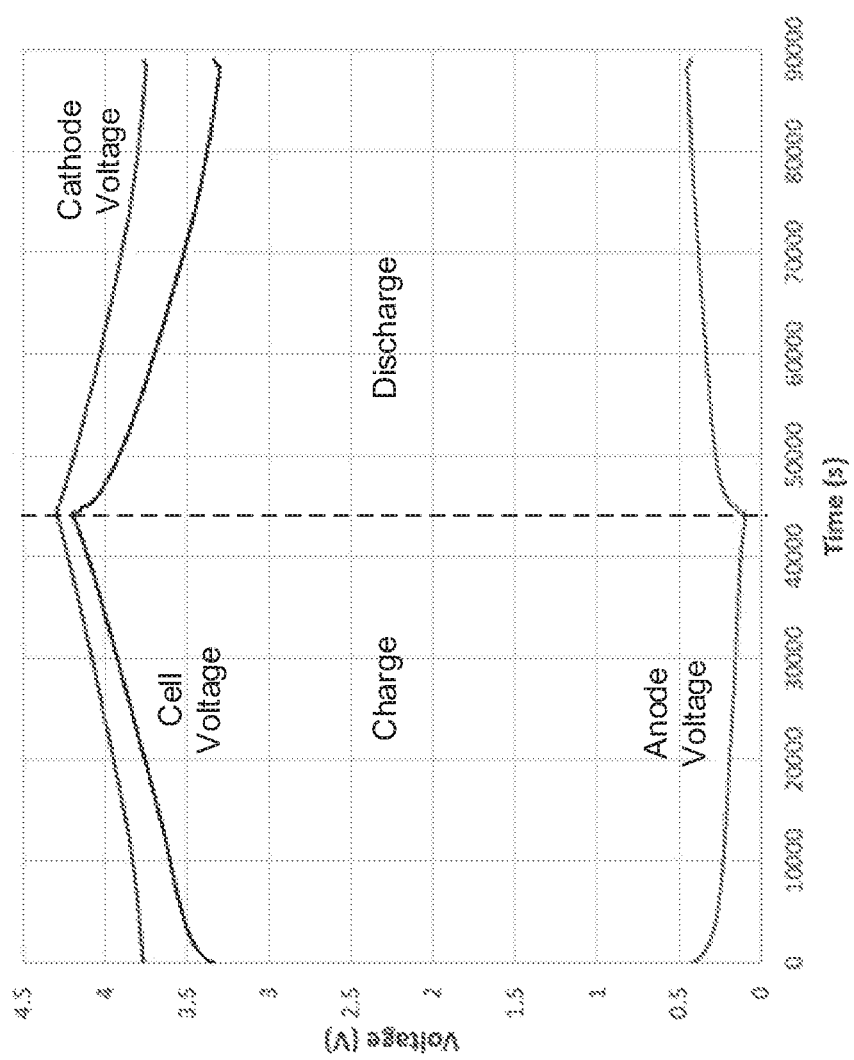
FIG. 8 illustrates electrode and cell voltages for a cell with silicon-dominant anode, in accordance with an example embodiment of the disclosure.

FIG. 8 illustrates electrode and cell voltages for a cell with silicon-dominant anode, in accordance with an example embodiment of the disclosure. Referring to FIG. 8, there is shown an anode voltage, cathode voltage, and cell voltage versus time for a charge and discharge cycle. The left half of the plot illustrates charging of the cell, where the cell voltage reaches a maximum of 4.2V at 45000 seconds, which is a C/10 charge rate for this cell example. The charge process reduces the anode voltage to ~0.1V. During normal operation of such a cell, due to the high specific capacity of the silicon in the anode, the anode voltage may be kept in a range that does not utilize the full range of the anode, effectively eliminating any lithium plating issues while also not fully delithiating the silicon causing more stress and potential cracking.

The right half of the plot illustrates a C/10 discharge of the cell, with the cell voltage dropping to ~3.4V. In this example scenario, the anode cycles between 0.1 and 0.5V, the cathode voltage is higher than graphite cells, and the cell voltage exhibits more slope than cells containing both silicon and graphite.

Figure 9:
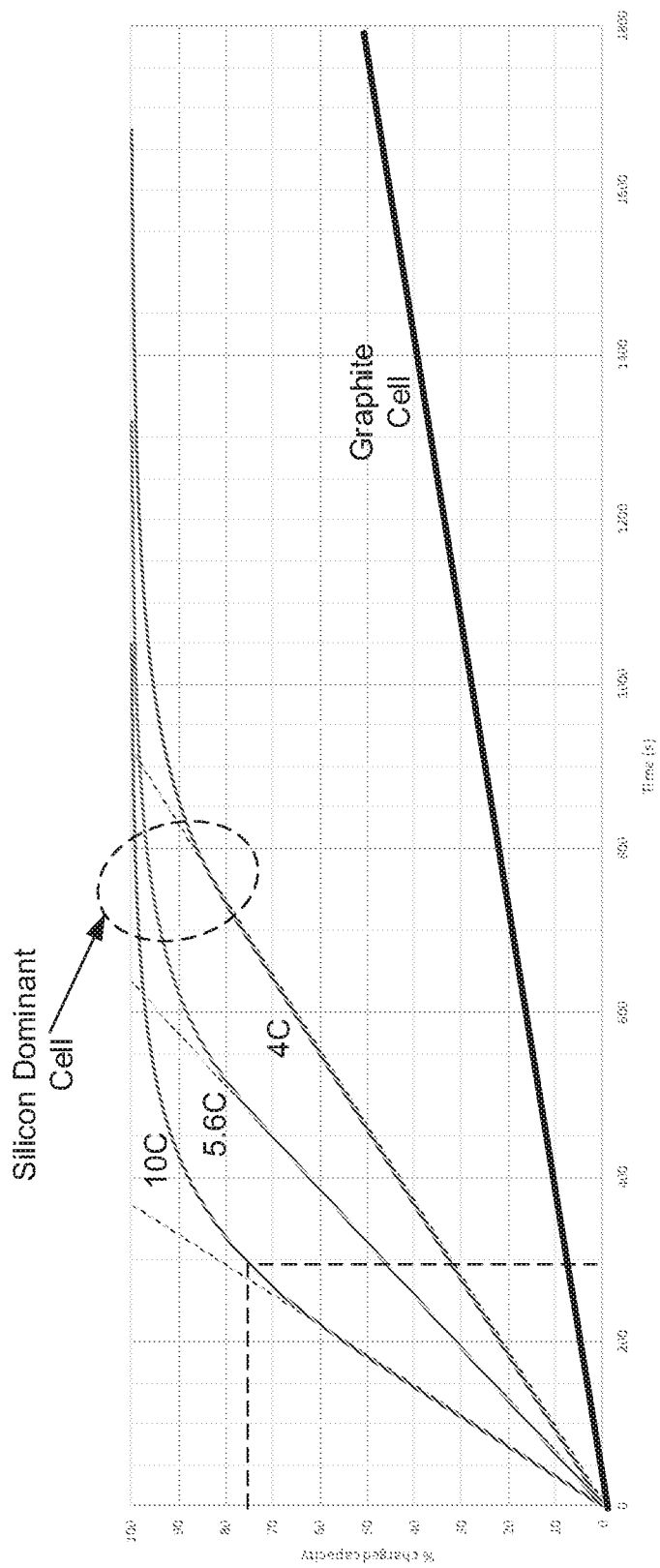
FIG. 9 illustrates charging rates for a graphite cell and a silicon-dominant cell, in accordance with an example embodiment of the disclosure.

FIG. 9 illustrates charging rates for a graphite cell and a silicon-dominant cell, in accordance with an example embodiment of the disclosure. Referring to FIG. 9, there is shown plots of percentage of full charge versus time for a cell with graphite with silicon additive anode and for a silicon-dominant anode cell. As seen in the plot, the graphite cell is still only 50% charged after 30 minutes, while the silicon-dominant anode cell reaches 75% charge in only 5 minutes when charged at a 10C rate. Even charging at a 10C rate, the cell retains at least 50% of 1C rate charge retention to 80% of original capacity of the battery.

These charge curves illustrate the advantage of silicon-dominant anode cells, where a smaller percentage of a larger amount of silicon is lithiated/delithiated during use, as compared to 100% of a smaller amount of silicon in silicon additive graphite cells being lithiated in addition to the graphite lithiation. As a material reaches maximum lithiation, the rate at which the material can take on more lithium decreases, which is why silicon graphite cells must be charged at a much slower rate. Because of the much higher specific capacity of silicon and because only a portion of the silicon needs to be lithiated in silicon-dominant anodes, the lithiation rate can remain high until fully charged, greatly increasing charge rate capability of the cells.

Figure 10:
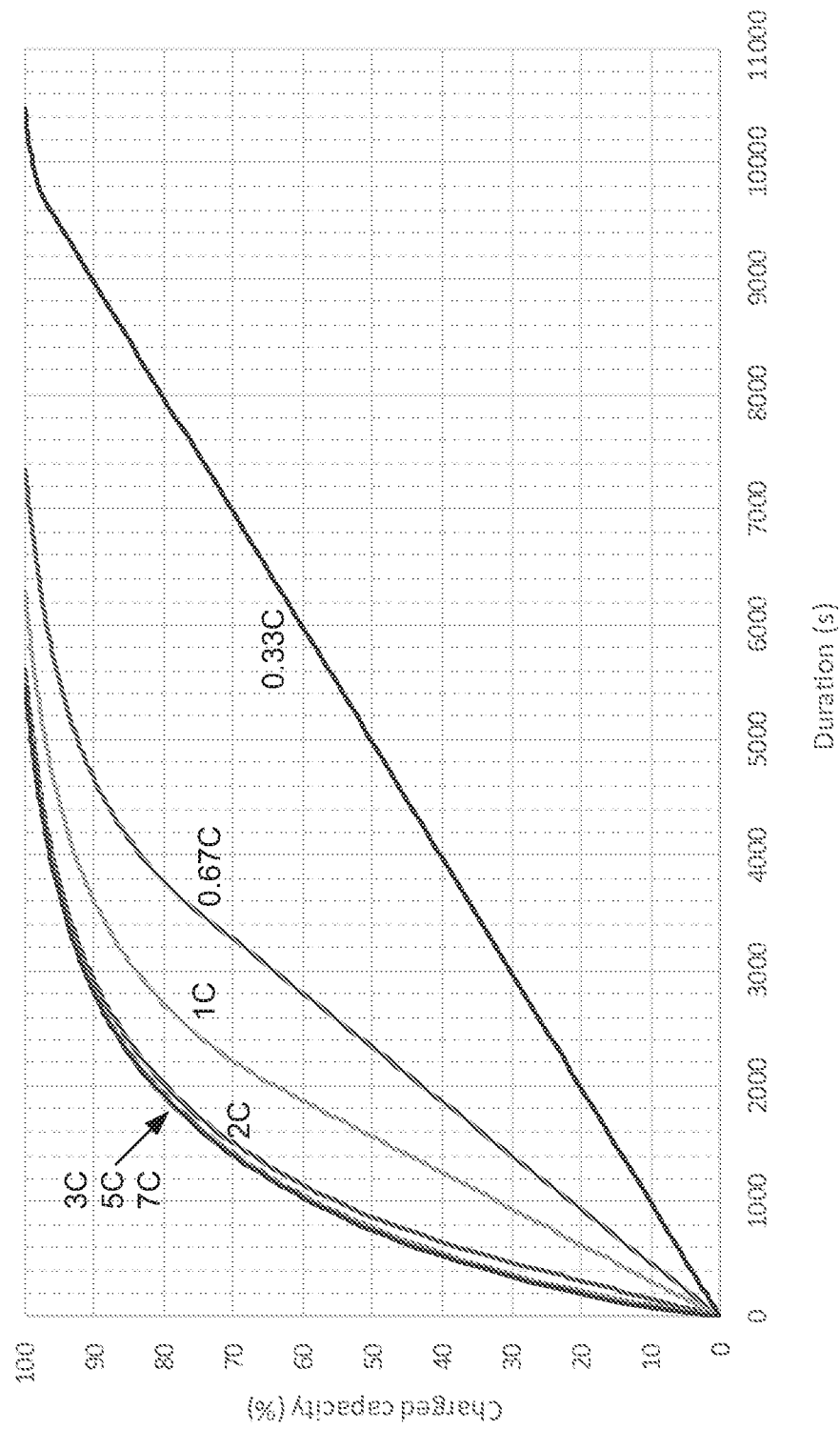
FIG. 10 illustrates charging durations for a silicon-dominant cell at low temperature, in accordance with an example embodiment of the disclosure.

FIG. 10 illustrates charging durations for a silicon-dominant cell at low temperature, in accordance with an example embodiment of the disclosure. Referring to FIG. 10, there is shown plots of percentage of full charge versus time for a cell a silicon-dominant anode cell at −20° C. As seen in the plot, the cell may reach 75% charged in less than 30 minutes, which is slower than room temperature charging, but is still at least possible without causing lithium plating.

FIG. 10 shows −20° C. charging for a silicon-dominant anode cell, but not for a silicon graphite cell, because conventional silicon graphite cells cannot be charged below 0° C. (32° F.). If attempted, although the pack appears to be charging normally, plating of metallic lithium can occur on the anode during a sub-freezing charge, which is permanent and cannot be removed with cycling. Advanced chargers do not attempt to charge cells when the temperature is below freezing, as the lithium plating is dangerous for cell operation.

Figure 11:
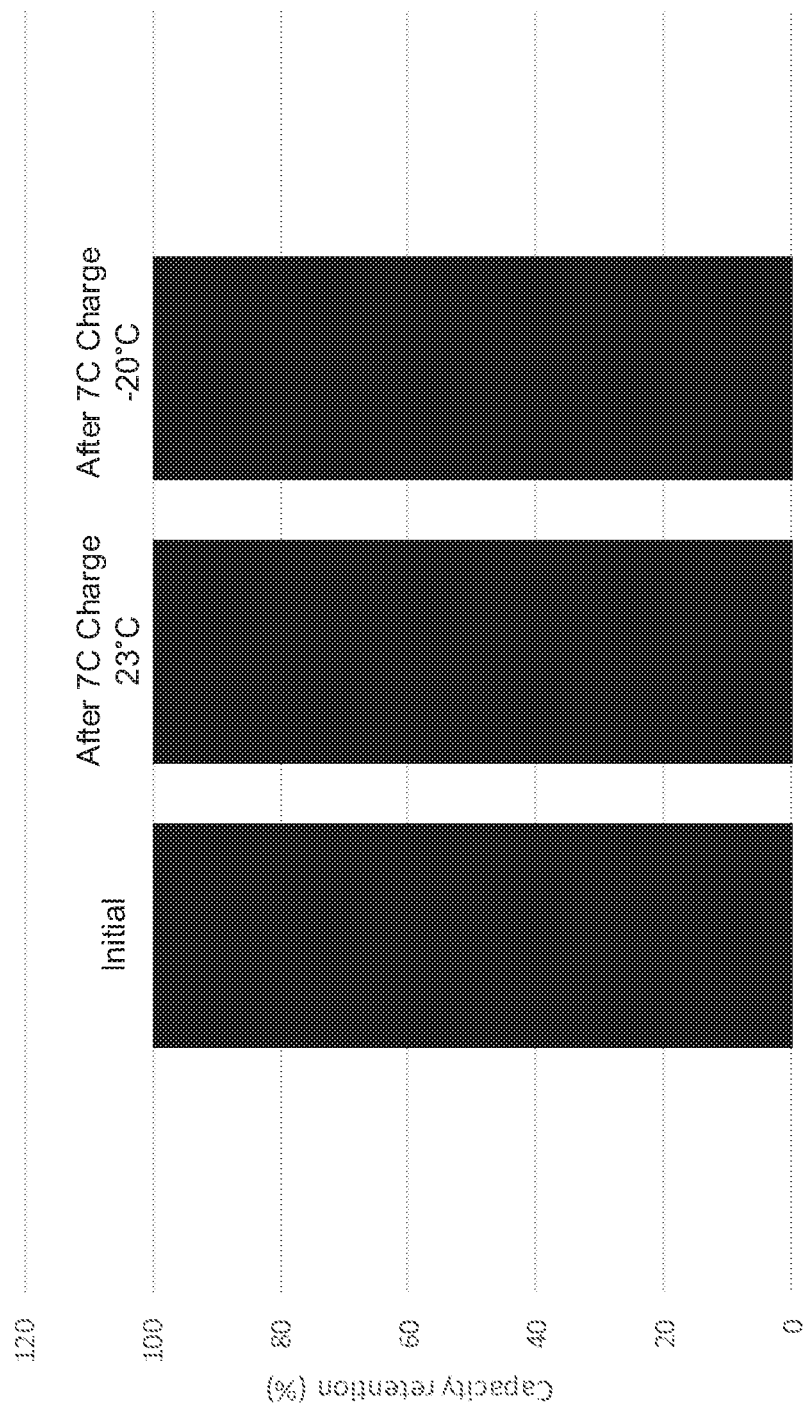
FIG. 11 illustrates capacity retention for silicon-dominant cells for different charge temperatures, in accordance with an example embodiment of the disclosure.

FIG. 11 illustrates capacity retention for silicon-dominant cells for different charge temperatures, in accordance with an example embodiment of the disclosure. Referring to FIG. 11, there is shown the capacity retention percentage of a silicon-dominant anode cell with the first bar representing the initial capacity at 100% and the second bar representing the capacity after a charge sequence of 0.3C, 0.7C, 1C, 2C, 3C, 5C, and 7C at 23° C. As can be seen, the cell has not lost any capacity after this sequence. The third bar represents the cell after the same charging sequence but at −20° C. This demonstrates that not only can the disclosed silicon-dominant anode cell be charged below freezing, but that it retains its capacity, which is in contrast to silicon graphite anode cells that suffer from lithium plating when attempting to charge at sub-freezing temperatures.

Figure 12:
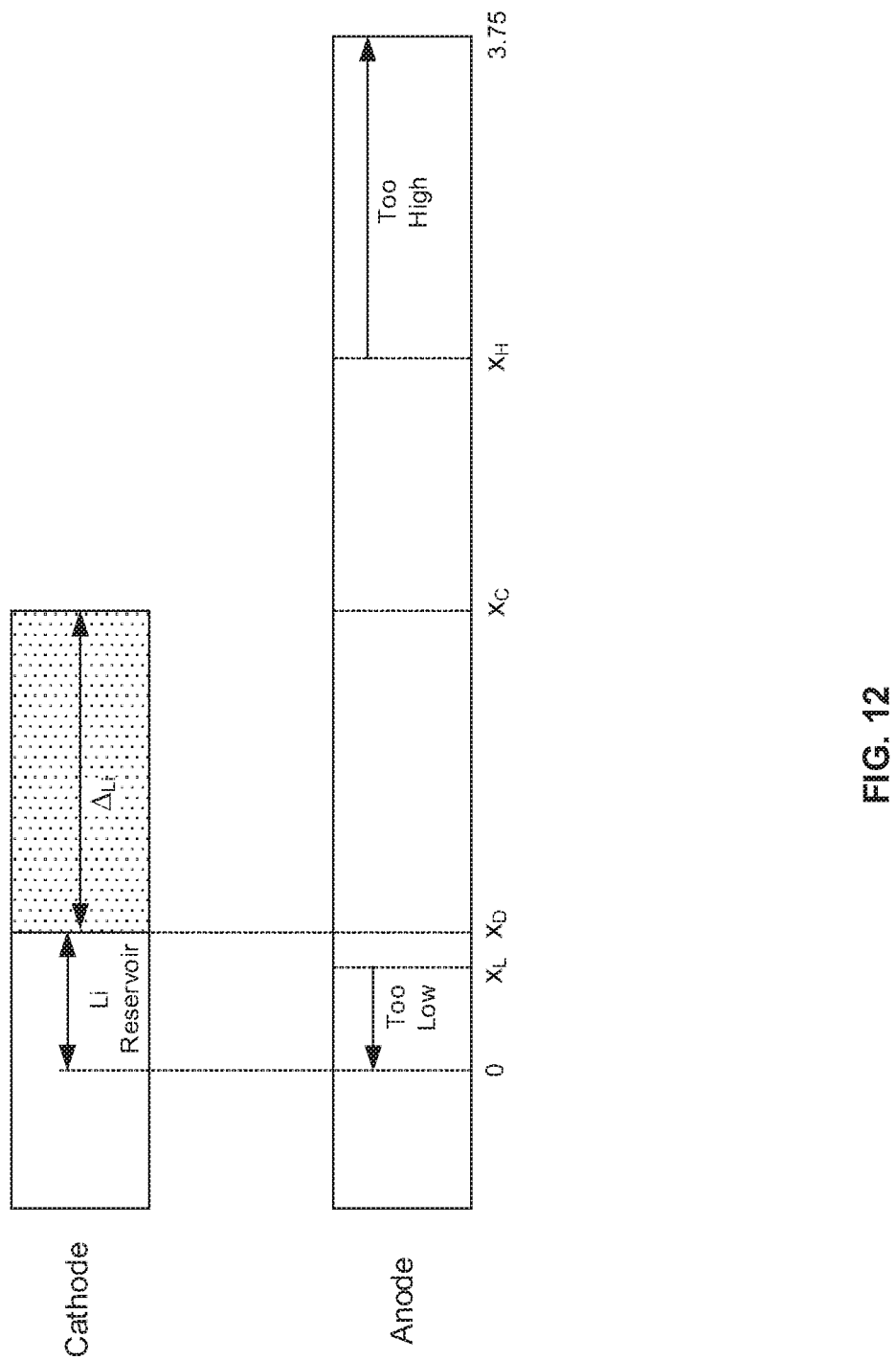
FIG. 12 illustrates an example lithiation and delithiation process for a silicon-dominant anode, in accordance with an example embodiment of the disclosure.

FIG. 12 illustrates an example lithiation and delithiation process for a silicon-dominant anode, in accordance with an example embodiment of the disclosure. Referring to FIG. 12, there are shown lithiation levels for a cathode and a silicon-dominant anode. The cathode lithiation level shows an amount $\Delta_{Li}$ that may be transferred to the anode in a charging process, raising the lithiation level of the anode from $x_D$ to $x_C$. As can be seen by the width of the anode capacity as compared to the cathode, a small percentage of the silicon lithiation capacity is used, which is why the charge rate can be so high as discussed above.

The anode lithiation level is shown on a scale from 0 to 3.75, where 3.75 indicates the fully lithiated phase of silicon, $Li_{3.75}Si$. The amount $\Delta_{Li}$ may be a function of the number of charge carriers in the cathode as well as the cathode discharge cutoff voltage. Therefore, in this example, the lithiation of the anode is controlled by the cutoff voltage, and for best cycle life, it should be kept above $x_L$. The discharged lithiation level, $x_D$, is a function of the irreversible charges of the anode and cathode, $Q_{irr,anode}$ and $Q_{irr,cathode}$, and the cutoff voltage, while the charged lithiation level $x_C$ is a function of the number of charge carriers in the material.

The large lithiation capacity of the silicon anode enables the configuration of the anode voltage during discharge well above that of the plating threshold. While the example shown in FIG. 12 illustrates an anode lithiated exclusively by the cathode, pre-lithiation of the anode may also be utilized to ensure that the lithiation level does not decrease below $x_L$, independent of the discharge voltage.

Figure 13:
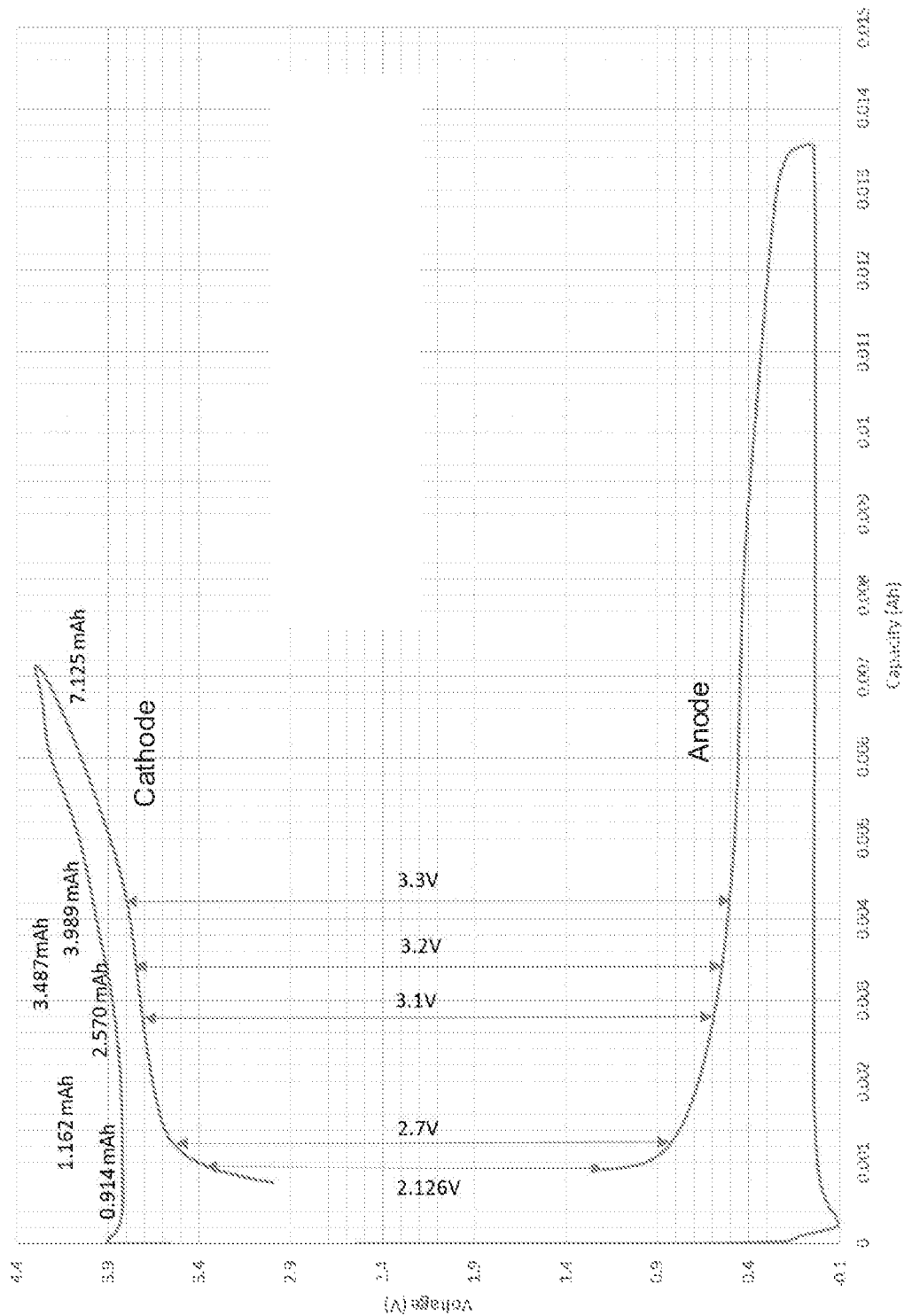
FIG. 13 illustrates voltage profile curves for a lithium ion battery with silicon-dominant anode, in accordance with an example embodiment of the disclosure.

FIG. 13 illustrates voltage profile curves for a lithium ion battery with silicon-dominant anode, in accordance with an example embodiment of the disclosure. Referring to FIG. 13, there is shown voltage profile curves for the anode and cathode and vertical lines with arrows indicating full cell voltage, and the resulting cell capacity in amp-hours on the x-axis for these various full cell voltages.

In this example, the total charge capacity of the cathode is half of the total capacity of the anode. During discharge, the cell voltage can be controlled in a way that the amount of lithium left in the anode is higher than the critical amount $x_L$, as described with respect to FIG. 12. For this particular cell, the cell capacity at 2.7 V is 5.963 mAh, at 3.1V is 4.555 mAh corresponding to 76.4% of total capacity, at 3.2V is 3.638 mAh corresponding to 61.0% of total capacity, and at 3.3 V is 3.136 mAh corresponding to 52.6% of total capacity.

As described above, this silicon-dominant anode configuration enables the anode voltage to remain well above voltages at which lithium plating occurs in the anode, thereby greatly increasing lifetime of the battery. Furthermore, because the capacity of the anode due to the silicon is so high and the utilization rate of the silicon can be kept low, the possible charge rate is much higher than silicon graphite anodes, and also enables low temperature charging as described previously.

Figure 14:
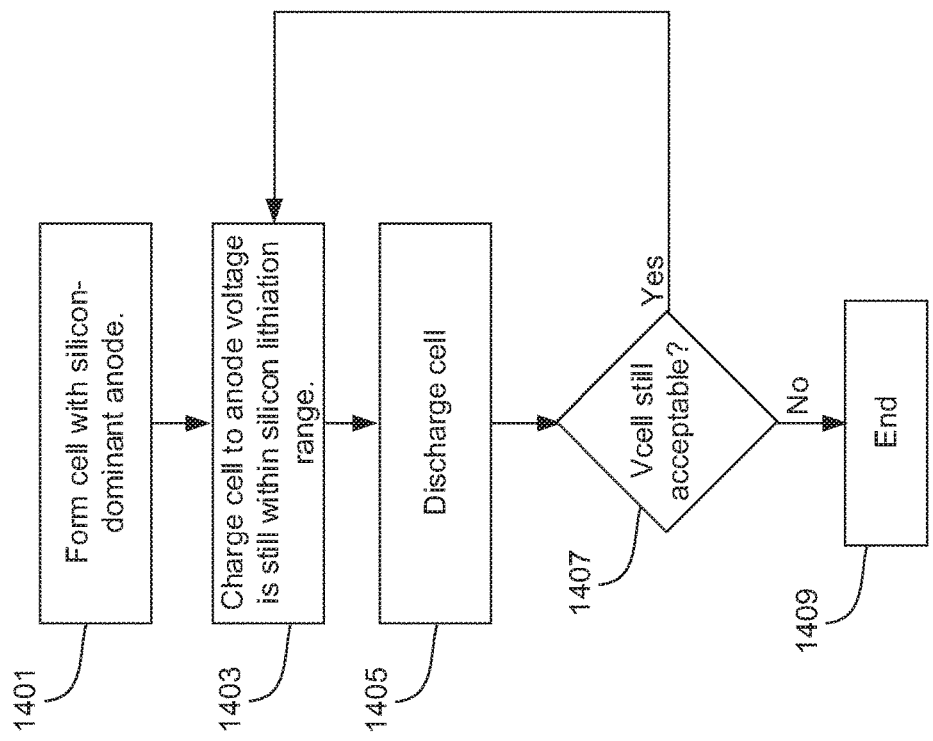
FIG. 14 illustrates a silicon-dominant anode cell use process, in accordance with an example embodiment of the disclosure.

FIG. 14 illustrates a silicon-dominant anode cell use process, in accordance with an example embodiment of the disclosure. Referring to FIG. 14, the process begins with step 1401 where a silicon-dominant anode is incorporated with a cathode and electrolyte to form a battery/cell. In step 1403, the cell may be charged, lithiating a portion of the silicon in the anode such that the silicon is not completely lithiated, configuring the anode voltage to remain above the minimum voltage for silicon lithiation. In step 1405, the cell may be discharged, and in step 1407 if the cell voltage is still acceptable, i.e., there is remaining cell lifetime, the process repeats step 1403, and if not, the cell ends at step 1409.

In an example embodiment of the disclosure, a method and system is described for silicon-dominant lithium-ion cells with controlled utilization of silicon. The battery may comprise a cathode, an electrolyte, and an anode, with the anode having an active material comprising more than 50% silicon. The battery may be charged by lithiating silicon while not lithiating or without lithiating carbon (i.e., carbon is not lithiated). The active material may comprise more than 70% silicon. A voltage of the anode during discharge of the battery may remain above a minimum voltage at which silicon can be lithiated. The anode may have a specific capacity of greater than 3000 mAh/g. The battery may have a specific capacity of greater than 1000 mAh/g. The anode may have a greater than 90% initial Coulombic efficiency. The anode active material may be polymer binder free. The battery may be operable to be charged at a 10C rate or higher while retaining at least 50% of 1C rate charge retention to 80% of original capacity of the battery. The battery may be charged at temperatures below freezing without lithium plating. The electrolyte may comprise a liquid, solid, or gel.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
   a cathode, an electrolyte, and an anode, the anode having an active material comprising more than 50% by weight of silicon in the active material,
   wherein the battery is chargeable to full charge by lithiating less than 100% of the silicon of the anode, and
   wherein the anode is pre-lithiated, with an amount of pre-lithiation set so that a lithiation level of the anode does not decrease below a pre-determined level that is independent of discharge voltage.

2. The battery according to claim 1, wherein the active material comprises more than 70% by weight of silicon.

3. The battery according to claim 1, wherein a voltage of the anode during discharge of the battery remains above a minimum voltage at which silicon can be lithiated.

4. The battery according to claim 1, wherein the anode has a specific capacity of greater than 3000 mAh/g.

5. The battery according to claim 1, wherein the battery has a specific capacity of greater than 1000 mAh/g.

6. The battery according to claim 1, wherein the anode has a greater than 90% of initial Coulombic efficiency.

7. The battery according to claim 1, wherein the active material has no polymer binder.

8. The battery according to claim 1, wherein the battery is operable to be charged at a 10C rate or higher while retaining at least 50% of 1C rate charge retention to 80% of original capacity of the battery.

9. The battery according to claim 1, wherein the battery can be charged at temperatures below freezing temperature of water without lithium plating.

10. The battery according to claim 1, wherein the electrolyte comprises a liquid, solid, or gel.

11. A method of forming and operating a battery, the method comprising:
    forming a battery comprising a cathode, an electrolyte, and an anode, the anode having an active material comprising more than 50% by weight of silicon in the active material,
    wherein the battery is chargeable to full charge by lithiating less than 100% of the silicon of the anode, and
    wherein the forming comprises pre-lithiating the anode, with an amount of pre-lithiation set so that a lithiation level of the anode does not decrease below a pre-determined level that is independent of discharge voltage.

12. The method according to claim 11, wherein the active material comprises more than 70% by weight of silicon.

13. The method according to claim 11, comprising configuring a voltage of the anode during discharge of the battery above a minimum voltage at which silicon can be lithiated.

14. The method according to claim 11, wherein the anode has a specific capacity of greater than 3000 mAh/g.

15. The method according to claim 11, wherein the battery has a specific capacity of greater than 1000 mAh/g.

16. The method according to claim 11, wherein the anode has a greater than 90% of initial Coulombic efficiency.

17. The method according to claim 11, wherein the active material has no polymer binder.

18. The method according to claim 11, comprising charging the battery at a 10C rate or higher.

19. The method according to claim 11, comprising charging the battery at temperatures below freezing temperature of water without lithium plating.

20. An anode for use in a battery, the anode comprising an active material comprising more than 50% by weight of silicon in the active material, wherein the anode is chargeable to full charge when in a battery by lithiating less than 100% by weight of the silicon of the anode, and wherein the anode is pre-lithiated, with an amount of pre-lithiation set so that a lithiation level of the anode does not decrease below a pre-determined level that is independent of discharge voltage.

21. The battery according to claim 1, wherein the battery is configured such that a voltage of the anode during discharge of the battery remains above a graphite lithiation voltage.

22. The method according to claim 11, wherein the forming comprises selecting or adjusting a composition and/or a structure of one or both of the active material and the anode to ensure that the battery is chargeable to full charge by lithiating less than 100% by weight of the silicon of the anode.

23. The method according to claim 11, wherein the battery is configured such that a voltage of the anode during discharge of the battery remains above a graphite lithiation voltage.

24. The anode according to claim 20, wherein a voltage of the anode during discharge of the battery remains above a graphite lithiation voltage.

* * * * *

UNITED STATES PATENT AND TRADEMARK OFFICE
CERTIFICATE OF CORRECTION

| | | |
|---|---|---|
| PATENT NO. | : 11,764,346 B2 | Page 1 of 1 |
| APPLICATION NO. | : 16/594508 | |
| DATED | : September 19, 2023 | |
| INVENTOR(S) | : Park et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 215 days.

Signed and Sealed this
First Day of July, 2025

Coke Morgan Stewart
*Acting Director of the United States Patent and Trademark Office*